United States Patent [19]

Yokoyama et al.

[11] 4,339,276

[45] Jul. 13, 1982

[54] WAX EMULSION

[75] Inventors: Nobuo Yokoyama; Nobuaki Kawabata, both of Yokohama, Japan

[73] Assignee: Nippon Oil Company, Limited, Tokyo, Japan

[21] Appl. No.: 212,916

[22] Filed: Dec. 3, 1980

[30] Foreign Application Priority Data

Dec. 8, 1979 [JP] Japan .................. 54-159516

[51] Int. Cl.$^3$ .............................. C08L 91/06
[52] U.S. Cl. ........................ 106/271; 428/485
[58] Field of Search .......................... 106/271

[56] References Cited

U.S. PATENT DOCUMENTS 4,218,263  8/1980  Kawabata ................ 106/270

FOREIGN PATENT DOCUMENTS 722758  11/1965  Canada ..................... 106/271
746086  11/1966  Canada ..................... 106/271
53-131979  11/1978  Japan ...................... 106/271
1212530  11/1970  United Kingdom ......... 106/271

Primary Examiner—Allan Lieberman
Assistant Examiner—P. Short
Attorney, Agent, or Firm—Jordan and Hamburg

[57] ABSTRACT

A wax emulsion is provided which comprises as essential ingredients (A) 100 parts by weight of a petroleum fraction wax having a melting point ranging within 40° to 90° C.; and (B) 3 to 20 parts by weight of an oxygen containing wax; said oxygen-containing wax being prepared by mixing 10 to 80 parts by weight of a petroleum fraction wax (I) having a melting point ranging within 50° to 85° C. with 90 to 20 parts by weight of a polyolefin wax (II) having a melting point ranging within 36° to 120° C., a number average molecular weight of from 310 to 1,000 and 5 to 50 double bonds per 1,000 carbon atoms to obtain a mixture, and then reacting 100 parts by weight of said mixture with 3 to 25 parts by weight of an unsaturated polycarboxylic acid or an anhydride thereof under a condition for forming free radicals.

24 Claims, No Drawings

WAX EMULSION

BACKGROUND OF THE INVENTION

1. Field of the Invention

This invention relates to a wax emulsion, and more particularly to a wax emulsion comprising as essential ingredients a petroleum fraction wax and a certain specified oxygen-containing wax.

2. Prior Art

Waxes separated from petroleum as heavy fractions are valuable materials used for manifold applications in crude form or after refined through various refining steps. Particularly, these waxes are used in various fields of art in the form of emulsions in which they are dispersed to be emulsified in water. These wax emulsions are generally coated on the surface of paper, fiber, wood or a variety of ceramic products or admixed to an aqueous emulsion of cement, paint or other materials. One of the important objects of the application of such an emulsion is to provide the material coated with the wax left after the water content of the emulsion with high water repellent and water-proof properties.

However, since the wax has high water repellent property of itself, the process of dispersing and emulsifying the wax is in conflict with the property of the wax. In order to obtain a stable emulsion, a large quantity amounting to more than 10% of an emulsifier must be added, and the water repellent or water-proof property of wax is considerably reduced as the quantity of the emulsifier is increased resulting in failure to attain the desired object.

In consideration of the contradiction as mentioned above, many efforts have been made to find a composition and technique for preparing an improved and stable wax emulsion by decreasing the added quantity of the emulsifier as small as possible or without adding any emulsifier in the extreme case. As the results of such efforts, many methods have been proposed including those disclosed in DT-AS No. 2,529,360 and Japanese Patent Provisonal Publication (Kokai-Koho) No. 131979/1978. The most generally employed method of emulsifying the waxes originated from the fractions of petroleum with the use of minimum quantity of an emulsifier is adding an oxygen-containing wax. The known oxygen-containing waxes used for this purpose are natural waxes, such as montan wax and bees wax, and synthetic waxes, such as oxidized paraffin and oxidized polyethylene waxes.

However, the known natural waxes have the disadvantages not only that the supply thereof is unstable but also that they have offensive odors and they contain contaminants of lower molecular weights. Moreover, the known oxygen-containing waxes have only a limited degree of freedom in varying the properties thereof, such as hardness, melting point, acid value and oil-soluble property, depending on the desired uses. Particularly, even if the properties of the known oxygen-containing waxes are varied to improve the emulsifying property and the strength of the resultant coating, satisfactory results have not been obtained. Furthermore, since the emulsifying property of the system and the properties of the resultant emulsion are changed materially by the addition of each of these known oxygen-containing waxes and by the attendant reduction in added quantity of an emulsifier, it has been required to develop a proper composition and a suitable emulsifying process. For this reason, the kind and quantity of oxygen-containing wax to be added to the emulsion has been limited.

OBJECTS AND SUMMARY OF THE INVENTION

An object of the present invention is to provide a wax emulsion in which the wax is excellent in emulsifying property and also can form a strong coating.

Another object of the present invention is to provide a stable wax emulsion which has an adequate viscosity.

A further object of the present invention is to provide a wax emulsion of desired property by the use of an oxygen-containing wax having the properties which can be controlled depending on the applied uses.

A still further object of the present invention is to provide a wax emulsion containing a wax which is hard and has a low melting point and high acid value.

Yet a further object of the present invention is to provide a wax emulsion which does not emit any offensive odor and has an improved hue.

Another object of the present invention is to provide a wax emulsion which forms a coating excellent in flexibility or elasticity.

The above and other objects will become apparent with refrence to the following detailed description of the invention.

According to the present invention, there is provided a wax emulsion comprising as essential ingredients: (A) 100 parts, by weight, of a petroleum fraction wax having a melting point ranging within 40° to 90° C.; and (B) 3 to 20 parts, by weight, of an oxygen-containing wax; said oxygen-contaning wax being prepared by mixing 10 to 80 parts, by weight, of a petroleum fraction wax (I) having a melting point ranging within 50° to 85° C. with 90 to 20 parts, by weight, of a polyolefin wax (II) having a melting point ranging within 36° to 120° C., a number molecular weight of from 310 to 1,000 and 5 to 50 double bonds per 1,000 carbon atoms to obtain a mixture, and then reacting 100 parts by weight, of said mixture with 3 to 25 parts, by weight, of an unsaturated polycarboxylic acid or an anhydride thereof under a condition for forming free radicals.

DESCRIPTION OF THE INVENTION

The wax emulsion according to the invention will be more specifically described hereinafter.

The petroleum fraction wax (A) used in the present invention includes the waxes originated from the fractional distillates of petroleum having melting points ranging within 40° to 90° C., and the specific examples thereof are paraffin wax and microcrystalline wax. Unrefined or crude paraffin waxes, such as slack wax or scale wax, may be used.

The component (B) used in the present invention is an oxygen-containing wax which is obtained by mixing 10 to 80 parts, by weight, of a petroleum fraction wax (I) having a melting point ranging within 50° to 85° C. with 90 to 20 parts, by weight, of a polyolefin wax (II) having a melting point ranging within 36° to 120° C., a number average molecular weight of from 310 to 1,000 and 5 to 50 double bonds per 1,000 carbon atoms to obtain a mixture, and then reacting 100 parts, by weight, of said mixture with 3 to 25 parts by weight of an unsaturated polycarboxylic acid or an ahydride thereof under a condition for forming free radicals. The specific examples of such oxygen-containing wax are disclosed in our pending Japanese Patent application laid open to the public by Japanese Patent Provisional (Kokai-Patent) Publication No. 81306/1979.

The petroleum fraction wax (I) used as the starting material or preparing the component (B), i.e. the oxygen-containing wax, is a wax originated from fractional distillates of petroleum having the melting points ranging within 50° to 85° C., preferably 50° to 70° C., and include the waxes used as the said component (A), i.e. the petroleum fraction wax (A).

The polyolefin wax (II) used as the other starting material for preparing the component (B), i.e. the oxygen-containing wax, includes polyethylene, polypropylene and co-polymers of olefins prepared from mixtures of olefins containing ethylene and propylene monomers. Among them, the polyethylene is the most preferred. These polyolefin waxes have the melting points ranging within 36° to 120° C., preferably 36° to 90° C., the number average molecular weights of from 310 to 1,000, preferably 310 to 600, and 5 to 50, preferably 10 to 45, double bonds per 1,000 carbon atoms.

The component (B), i.e. the oxygen-containing wax, is prepared by the steps of mixing the aforementioned petroleum fraction wax (I) with the aforementioned polyolefin wax (II) at a ratio of 10~80 parts to 90~20 parts, preferably 30~70 to 70~30 parts, by weight, to obtain a mixture, and then reacting 100 parts, by weight, of the aforementioned mixture with 3 to 25 parts, preferably 10 to 20 parts, by weight, of an unsaturated polycarboxylic acid or an anhydride thereof under a condition for forming free radicals.

If the quantity of said polyolefin wax (II) admixed to said petroleum fraction wax (I) does not reach the lower limit of the range as defined above, the acid value of the resultant reaction product becomes too low to form a stable wax emulsion. On the contrary, if the quantity of said polyolefin wax (II) is in excess of the upper limit of the aforementioned range, the hue of the resultant product becomes worse.

The condition for forming free radicals means the condition under which free radicals are formed by adding 0.2 to 5 parts by weight of an organic peroxide to 100 parts, by weight, of the wax mixture. As the examples of the organic peroxide for forming free radicals, there may be mentioned di-tert-butyl peroxide, tert-butylhydro peroxide, dicumyl peroxide, tert-butylcumyl peroxide, cumylhydro peroxide, 2,5-dimethyl-2,5-di(tert-butylperoxy)hexane, 2,5-dimethyl-2,5-di(tert-butylperoxy)hexyne-3 and methyl ethyl ketone peroxide. Any of the peroxides described above may be used singly or may be used in combination, and the most preferred peroxide used in the invention is di-tert-butyl peroxide.

Examples of unsaturated polycarboxylic acids or anhydrides thereof include maleic acid, itaconic acid, citraconic acid and anhydrides thereof. The most preferred unsaturated polycarboxylic acid is maleic acid. The quantity of unsaturated polycarboxylic acid or anhydride thereof admixed to said mixture affects serious influences on the properties of resultant oxygen-containing wax. If the added quantity is less than the defined range, the acid value of the reaction product becomes too low to fail to have satisfactory emulsifying property. On the contrary, if the quantity of the unsaturated polycarboxylic acid is in excess of the defined range, the acid value of the reaction product becomes too high and in some cases unreacted acids are left to necessitate a complicated removal operation. Although the reaction condition is not specifically limited, the reaction may be carried out, for example at a temperature of from 120° to 220° C., preferably 140° to 180° C., for 0.5 to 6.0, preferably 1 to 3, hours.

In the preparation of the wax emulsion of the present invention, the petroleum fraction wax (A) is mixed with the oxygen-containing wax (B) in a ratio of 100 parts of the component (A) to 3 to 20 parts, preferably 5 to 10 parts, by weight of the component (B). If the quantity of the component (B) is less than the lower limit of the aforementioned range, the effect of the component (B) is insufficient so that the amount of required emulsifier is not reduced. On the contrary, if the quantity of the component (B) exceeds the upper limit of the aforementioned range, the waterproof, electric insulation and weather-proof properties the wax are deteriorated.

In the wax emulsion of the present invention, less than 10 parts, preferably less than 5 parts, by weight, of an emulsifier (C) may be added in addition to the components (A) and (B). The emulsifier may be selected from a variety of generally available emulsifiers including nonion, cation and anion emulsifiers. When a nonion emulsifier is used, a suitable emulifier may be selected in view of the HLB value calculated from the mixed ratio of the petroleum fraction wax (A) having an HLB value of about 10 and the oxygen-containing wax (B) having an HLB value of about 17 to 18. Specific examples of nonion emulsifier are commercially available Span 60 and 80, Tween 60 and 80 and Emulgen 420, all produced by the Kao-Atlas Co., Ltd. The concrete examples of nonion emulsifier which may be used according to the present invention include polyoxyethylene alkyl ether such as polyoxyethyleneoleyl ether or polyoxyethylenenonylphenol ether; sorbitan fatty acid ester such as sorbitan monolaurate, sorbitan monopalmitate, sorbitan monostearate, sorbitan tristerate, sorbitan monooleate or sorbitan trioleate; polyoxyethylene sorbitan fatty acid ester such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate or polyoxyethylene sorbitan trioleate; and polyoxyethylene fatty acid ester such as polyethyleneglycol monolaurate, polyethyleneglycol monostearate, polyethyleneglycol distearate or polyethyleneglcyol monooleate.

A cation emulsifier is particularly effective, since it ionizes the acidic groups contained in the oxygen-containing wax (B) to activate the same, and preferable examples thereof are morpholine and polyoxyethylene alkyl amine. The action of the cation emulsifier can be enhanced by adding an anion emulsifier, in an equivalent smaller than that of the added cation emulsifier.

Examples of anion emulsifier which may be used according to the present invention include fatty acid and a salt thereof such as oleic acid, a salt of alkylsulfuric acid ester such as sodium salt of laurylsulfate and a salt of alkylsulfonic acid ester such as a sodium salt of dodecyl benzene sulfonate or a sodium salt of dialkylsulfosuccinate.

EXAMPLES OF THE INVENTION

The present invention will be described more specifically by referring to the Examples and Comparative Examples.

EXAMPLE 1

(i) Preparation of Oxygen-containing Wax:

Equal quantities of the petroleum fraction wax (I) and the polyolefin wax (II) were mixed together to be used for the starting material. The used petroleum fraction wax was 145° F. paraffin wax (Melting Point: 63° C.) refined through a normal refining steps. The used polyolefin wax was a low molecular weight polymer of ethylene of white waxy form having a melting point of 80° C., a penetration of 11 and an average molecular weight of 460 and containing 32 double bonds per 1,000 carbon atoms including 78% of vinyl type double bonds, 18% of vinylidene type double bonds and 4% of vinylene type double bonds.

To 100 parts, by weight, of the mixture containing the equal quantities of the waxes (I) and (II) was added 13 parts, by weight, of maleic anhydride, and heated to 150° C., to which there was added a solution obtained by dissolving 1 part, by weight, of di-tert-butyl peroxide in 5 parts, by weight, of xylene, while agitating. After agitating for additional 30 minutes, volatile materials were removed under reduced pressure, and then the reaction mixture was filtered under pressure to obtain a light yellow oxygen-containing wax. The thus formed oxygen-containing wax had a melting point of 70° C., a penetration of 0.5, an acid value of 92 and a saponification value of 92.

(ii) Preparation of Wax Emulsion:

315 parts, by weight, of 125° F. paraffin was used as the petroleum fraction wax (A) to which added was 35 parts, by weight, of the oxygen-containing wax prepared by the step (i) above. The mixture was heated to be melted, and added with successively 4 parts, by weight, of oleic acid and 10 parts by weight, of morpholine, while agitating. While agitating the mixture vigorously, 650 parts, by weight, of water heated at 90° C. was slowly added to the mixture to obtain an uniform white liquid phase. This liquid was slowly cooled to 65° C. and passed through a Manton-Gaulin homogenizer available from Manton-Gaulin Mfg. Inc. at a pressure of 200 Kg/cm² to obtain a stable white wax emulsion.

This emulsion had a viscosity of 7 cp. after the lapse of one day from the time of preparation and the viscosity thereof after being left for standing for one month was 9 cp. This emulsion was evaporated to dryness to find that the solid content thereof was 35%, by weight. This emulsion was coated on a glass plate which was exposed to flowing water after the lapse of 3 minutes from the time of coating. The coating was not changed or damaged by flowing water. Water droplets were scattered on the dried coating and allowed to stand for drying. No trace of water droplets was left on the coating.

EXAMPLES 2 to 8

The oxygen-containing wax prepared by the step (i) in Example 1 was combined with a variety of petroleum fraction waxes (A) to prepare wax emulsions. The compositions and properties thereof are shown in Table 1 together with the composition and property of Example 1.

The viscosity was measured using a rotation viscometer after each of the emulsions was allowed to stand at room temperature for one day.

The marks appearing in the following Tables 1 and 3 for indicating the stability mean as follows:

Mark ⊙ : No substantial change was observed in viscosity and appearance after the emulsion was allowed to stand at room temperature for one month.

Mark o: Although some changes were observed, it was judged that the changes were within the limit causing no obstacle for practical uses.

Mark Δ: Although appreciable changes were observed, the emulsion was held in an uniformly emulsified state.

Mark x: The emulsion was not held in an uniformly emulsified state due to separation or solidifcation.

The 135° F. slack was used in the Examples and Comparative Examples was a crude wax generally used for preparing the 135° F. paraffin wax and was not yet refined through the sweating and decoloring steps.

Oleic acid and morpholine used in the Examples and Comparative Examples were chemical reagents for general uses, and the other emulsifiers were the products available from Kao-Atlas Co., Ltd.

TABLE 1

| | Composition of Wax Emulsion (Parts by weight) | | | | | | Properties of Wax Emulsion | | | |
|---|---|---|---|---|---|---|---|---|---|---|
| | (A) Petroleum Fraction Wax | | (B) Oxygen-Containing Wax | (C) Emulsifier | | Water | Solid Content | Viscosity | Stability |
| Example 1 | 125° F. Paraffin | 315 | 35 | Oleic Acid Morpholine | 4 10 | 650 | 35% | 7 cp. | ⊙ |
| Example 2 | 125° F. Paraffin | 360 | 40 | Oleic Acid Morpholine | 4.5 11 | 600 | 41% | 30 cp. | ⊙ |
| Example 3 | 125° F. Paraffin | 315 | 35 | Oleic Acid Triethanolamine | 2 7 | 650 | 35% | 11 cp. | O |
| Example 4 | 125° F. Paraffin | 322 | 28 | Oleic Acid Morpholine | 5.5 10 | 650 | 35% | 8 cp. | O |
| Example 5 | 125° F. Paraffin | 315 | 35 | Oleic Acid Morpholine Span 80 Tween 80 | 3.5 7 1 2.5 | 650 | 37% | 7 cp. | Δ |
| Example 6 | 135° F. Slack Wax | 375 | 25 | Oleic Acid Morpholine | 3 7 | 600 | 40% | 73 cp. | ⊙ |
| Example 7 | 180° F. Micro-Wax | 277 | 23 | Span 60 Tween 60 Emulgen 420 | 9 6 6 | 700 | 32% | 42 cp. | O |
| Example 8 | 125° F. Paraffin | 315 | 35 | — | | 650 | 35% | 60 cp. | Δ |

EXAMPLE 9

Equal quantities of the petroleum fraction wax (I) and the polyolefin wax (II) were mixed together to be used for the starting material. The used petroleum fraction wax was 140° F. paraffin wax refined through normal refining steps. The used polyolefin wax (II) was a low molecular weight polymer of ethylene of white waxy form having a melting point of 39° C., a penetration of more than 80 and an average molecular weight of 320, and containing 42 double bonds per 1,000 carbon atoms including 88% of vinyl type double bonds, 11% of vinylidene type double bonds and 1% of vinylene type double bonds.

To 100 parts, by weight, of the mixture containing the equal quantities of the waxes (I) and (II) was added 10 parts, by weight, of maleic anhydride, and heated to 150° C., to which added was a solution obtained by dissolving 1 part, by weight, of di-tert-butyl peroxide in 5 parts, by weight, of xylene, while agitating. After agitating for additional 30 minutes, volatile materials were removed under reduced pressure, and then the reaction mixture was filtered under pressure to obtain a light yellow oxygen-containing wax. The thus formed oxygen-containing wax had a penetration of 15 and a saponification value of 61.

Using this oxygen-containing wax, a wax emulsion was prepared similarly as in Example 1. The emulsion had improved properties substantially equivalent to those of the emulsion of Example 1. This wax emulsion was impregnated in kraft paper, which was further overcoated with the emulsion and dried to form a wax coating of about 50 microns in thickness. The thus coated paper was bent to determine the angle at which cracks were observed to test the elasticity. Similarly, the wax emulsion of Example 1 was coated on kraft paper to test the elasticity. The results are shown in Table 2.

TABLE 2

| Used Wax Emulsion | Bent Angle at Which Cracks Occur |
|---|---|
| Emulsion of Example 1 | 75° |
| Emulsion of Example 9 | 110° |

As will be apparent from the results shown in Table 2, the oxygen-containing wax of Example 9 is preferred when the elasticity of the wax coating is an important factor. One of the important features of the invention resides in that an adequate wax emulsion can be prepared by selecting a proper material depending on the applied use.

COMPARATIVE EXAMPLES 1 to 4

Comparative Examples 1 to 3 shown in Table 3 are the examples of wax emulsion similar to the wax emulsion of Example 6 except in that the added quantities of the oxygen-containing wax (B) are smaller than the lower limit of therange defined by the present invention. All of them were not preferred when used as wax emulsions because of too high viscosity or the lack of stability. On the other hand, Example 4 is an example of wax emulsion in which the added quantity of the oxygen-containing wax (B) exceeds the upper limit of the range defined by the present invention. Although the stability of the wax emulsion of Example 4 is satisfactory, the coating formed on a glass plate in accordance with a similar procedure as in Example 1 was carried away by flowing water after the lapse of 10 minutes. Water droplets were scattered on the dried coating and allowed to stand for drying to leave white traces.

COMPARATIVE EXAMPLES 5 and 6

Comparative Examples 5 and 6 are wax emulsions prepared by using an oxidized paraffin having an acid value of 55 in place of the oxygen-containing wax (B) used in the present invention, said oxidized paraffin being prepared by oxidizing 135° F. paraffin wax with air using cobalt naphthenate as the catalyst. The wax emulsion of Comparative Example 5 was solidified. A coating was formed from the wax emulsion of Comparative Example 6 and dried. The dried coating emitted an offensive odor inherent to the oxidized wax.

TABLE 3

| | Composition of Wax Emulsion (parts by weight) | | | Properties of Wax Emulsion | | | |
|---|---|---|---|---|---|---|---|
| | (A) Petroleum Fraction Wax | (B) Oxygen-Containing Wax | (C) Emulsifier | Water | Solid Content | Viscosity | Stability |
| Example 6 | 135° F. Slack wax 375 | 25 | Oleic Acid 3 Morpholine 7 | 600 | 40% | 73 cp. | ◉ |
| Comparative Example 1 | 135° F. Slack Wax 400 | 0 | Oleic Acid 20 Morpholine 20 | 600 | | Solidified | |
| Comparative Example 2 | 135° F. Slack Wax 392 | 8 | Oleic Acid 10 Morpholine 20 | 600 | | Solidified | |
| Comparative Example 3 | 135° F. Slack Wax 390 | 10 | Oleic Acid 10 Morpholine 20 | 600 | 41% | 180 cp. | Δ |
| Comparative Example 4 | 135° F. Slack Wax 320 | 80 | Oleic Acid 5 Morpholine 15 | 600 | 41% | 30 cp. | O |
| Comparative Example 5 | 135° F. Slack Wax 382 | Oxidized Paraffin 18 | Oleic Acid 5 Morpholine 10 | 600 | | Solidified | |
| Comparative Example 6 | 125° F. Paraffin 315 | Oxidized Paraffin 35 | Oleic Acid 4 Morpholine 10 | 650 | 35% | 65 cp. | Δ |

Although the present invention has been described with reference to the specific examples thereof, it should be understood that various modifications and variations can be easily made by those skilled in the art without departing from the spirit of the invention. It is intended to include all such modifications and variations within the wide scope of the invention as defined in the appended claims.

What is claimed is:

1. A wax emulsion consisting essentially of:
(A) a petroleum fraction wax with a melting point from 40° to 90° C.;
(B) an oxygen containing wax prepared by mixing
10 to 80 parts by weight of a petroleum fraction wax (I) with a melting point from 50° to 85° C. with
90 to 20 parts by weight of a polyolefin wax (II) selected from the group consisting of polyethylene, polypropylene, copolymers of ethylene and propylene and mixtures thereof with a melting point from 36° to 120° C., a number average molecular weight of 310 to 1,000, and 5 to 50 double bonds per approximately 1,000 carbon atoms, and
reacting about 100 parts by weight of said mixture (B) (I) and (II) with 3 to 25 parts by weight of a compound selected from the group consisting of unsaturated polycarboxylic acids, unsaturated polycarboxylic acid anhydrides and mixtures thereof in the presence of 0.2 to 5 parts by weight of an organic peroxide; and (C) water, wherein the amount of component (B) is 3 to 20 parts by weight to about 100 parts by weight of component (A).

2. A wax emulsion according to claim 1, further including less than about 10 parts by weight of an emulsifier (D).

3. A wax emulsion according to claim 1, wherein said petroleum fraction wax (A) having a melting point ranging within 40° to 90° C. is selected from the group consisting of paraffin wax, microcrystalline wax and unrefined paraffin wax and mixtures thereof.

4. A wax emulsion according to claim 1, wherein said petroleum fraction wax (I) having a melting point ranging within 50° to 85° C. is selected from the group consisting of paraffin wax, microcrystalline wax and refined paraffin wax and mixtures thereof.

5. A wax emulsion according to claim 3 or 4, wherein said unrefined paraffin wax is selected from the group consisting of slack wax and scale wax and mixtures thereof.

6. A wax emulsion according to claim 1, wherein said unsaturated polycarboxylic acid or the anhydride thereof is selected from the group consisting of maleic acid, itaconic acid, citraconic acid and anhydrides of maleic, itaconic and citraconic acids and mixtures thereof.

7. A wax emulsion according to claim 1, wherein said organic peroxide is selected from the group consisting of di-tert-butyl peroxide, tert-butylhydro peroxide, dicumyl peroxide, tert-butylcumyl peroxide, cumylhydro peroxide, 2,5-dimethyl-2,5-di(tert-butylperoxy)hexane, 2,5-dimethyl-2,5-di(tert-butylperoxy)hexyne-3 and methyl ethyl ketone peroxide and mixtures thereof.

8. A wax emulsion according to claim 2, wherein said emulsifier (D) is selected from the group consisting of nonion, cation and anion emulsifiers and mixtures thereof.

9. A wax emulsion according to claim 8, wherein said nonion emulsifier is selected from the group consisting of polyoxyethylene alkyl ether, sorbitan fatty acid ester, polyoxyethylene sorbitan fatty acid ester and polyoxyethylene fatty acid ester and mixtures thereof.

10. A wax emulsion according to claim 9, wherein said polyoxyethylene alkyl ether is selected from the group consisting of polyoxyethyleneoleyl ether and polyoxyethylenenonylphenol ether and mixtures thereof.

11. A wax emulsion according to claim 9, wherein said sorbitan fatty acid ester is selected from the group consisting of sorbitan monolaurate, sorbitan monopalmitate, sorbitan monostearate, sorbitan tristearate, sorbitan monooleate and sorbitan trioleate and mixtures thereof.

12. A wax emulsion according to claim 9 wherein said polyoxyethylene sorbitan fatty acid ester is selected from the group consisting of polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate and polyoxyethylene sorbitan trioleate and mixtures thereof.

13. A wax emulsion according to claim 9, wherein said polyoxyethylene fatty acid ester is selected from the group consisting of polyethyleneglycol monolaurate, polyethyleneglycol monostearate, polyethyleneglycol distearate and polyethyleneglycol monooleate and mixtures thereof.

14. A wax emulsion according to claim 8, wherein said cation emulsifier is selected from the group consisting of morpholine and polyoxyethylene alkyl amine and mixtures thereof.

15. A wax emulsion according to claim 8, wherein said anion emulsifier is selected from the group consisting of fatty acid and a salt thereof, a salt of alkylsulfuric acid ester and a salt of alkylsulfonic acid ester and mixtures thereof.

16. A wax emulsion according to claim 15, wherein said fatty acid is oleic acid.

17. A wax emulsion according to claim 15 wherein said salt of alkylsulfuric acid ester is a sodium salt of laurylsulfate.

18. A wax emulsion according to claim 15, wherein said salt of alkylsulfonic acid ester is selected from the group consisting of a sodium salt of dodecyl benzene sulfonate and a sodium salt of dialkylsulfosuccinate and mixtures thereof.

19. The wax emulsion of claim 1 wherein the petroleum fraction wax (I) used to prepared component (B) has a melting point of 50° to 70° C.

20. The wax emulsion of claim 19 wherein the polyolefin wax (II) has a melting point of 36° to 90° C., a number average molecular weight of 310 to 600, and 10 to 45 double bonds per approximately 1,000 carbon atoms.

21. The wax emulsion of claim 20 wherein 30 to 70 parts by weight of petroleum fraction wax (I) and 70 to 30 parts by weight of polyolefin wax (II) are mixed to prepare component (B).

22. The wax emulsion of claim 21 wherein 10 to 20 parts by weight of a compound selected from the group consisting of unsaturated polycarboxylic acids, unsaturated polycarboxylic acid anhydrides, and mixtures thereof are reacted with about 100 parts by weight of said mixture (B) (I) and (II).

23. The wax emulsion of claim 2 containing less than about 5 parts by weight of an emulsifier (D).

24. The wax emulsion of claim 9 wherein said petroleum wax fraction (A) has an HLB value of about 10 and the oxygen containing wax fraction has an HLB of about 17 to 18.

* * * * *